United States Patent
Khanna

(10) Patent No.: US 12,254,086 B2
(45) Date of Patent: Mar. 18, 2025

(54) SYSTEMS AND METHODS FOR ENABLING DETECTION OF THREATS BASED UPON COLOR

(71) Applicant: Fortinet, Inc., Sunnyvale, CA (US)

(72) Inventor: Sameer Khanna, Cupertino, CA (US)

(73) Assignee: Fortinet, Inc., Sunnyvale, CA (US)

(*) Notice: Subject to any disclaimer, the term of this patent is extended or adjusted under 35 U.S.C. 154(b) by 376 days.

(21) Appl. No.: 17/831,185

(22) Filed: Jun. 2, 2022

(65) Prior Publication Data
US 2023/0057125 A1 Feb. 23, 2023

Related U.S. Application Data

(60) Provisional application No. 63/235,887, filed on Aug. 23, 2021.

(51) Int. Cl.
| | |
|---|---|
| *G06F 21/55* | (2013.01) |
| *G06F 18/24* | (2023.01) |
| *G06F 21/31* | (2013.01) |
| *G06F 21/62* | (2013.01) |
| *G06F 40/157* | (2020.01) |
| *G06F 40/205* | (2020.01) |
| *G06F 40/242* | (2020.01) |
| *G06F 40/279* | (2020.01) |
| *G06F 40/284* | (2020.01) |
| *G06V 10/56* | (2022.01) |
| *G06V 10/764* | (2022.01) |
| *G06V 10/776* | (2022.01) |
| *G06V 40/20* | (2022.01) |
| *H04L 9/40* | (2022.01) |
| *H04L 43/045* | (2022.01) |

(52) U.S. Cl.
CPC ............ *G06F 21/552* (2013.01); *G06F 18/24* (2023.01); *G06F 21/316* (2013.01); *G06F 21/6218* (2013.01); *G06F 40/242* (2020.01); *G06F 40/279* (2020.01); *G06F 40/284* (2020.01); *G06V 10/56* (2022.01); *G06V 10/764* (2022.01); *G06V 10/776* (2022.01); *G06V 40/20* (2022.01); *H04L 43/045* (2013.01); *H04L 63/1416* (2013.01); *H04L 63/1425* (2013.01); *G06F 40/157* (2020.01); *G06F 40/205* (2020.01)

(58) Field of Classification Search
CPC .... G06F 21/552; G06F 40/279; G06F 40/284; G06F 40/242; G06V 10/56; G06V 40/20; G06V 10/776; G06V 10/764
See application file for complete search history.

(56) References Cited

U.S. PATENT DOCUMENTS

| | | |
|---|---|---|
| 11,651,313 B1 | 5/2023 | Fridakis |
| 2017/0061123 A1 | 3/2017 | Parker-Wood |
| 2017/0070527 A1 | 3/2017 | Bailey |
| 2018/0191726 A1 | 7/2018 | Luukkala |
| 2020/0186544 A1 | 6/2020 | Dichiu |
| 2023/0007024 A1* | 1/2023 | Maria Vega ........ H04L 63/1441 |
| 2023/0039039 A1 | 2/2023 | Keraudy |

OTHER PUBLICATIONS

KHANNA "Conical Classification for Computationally Efficient One-Class Topic Determination" Cornell Universtiy Oct. 31, 2021.

* cited by examiner

*Primary Examiner* — David Perlman
(74) *Attorney, Agent, or Firm* — Jaffery Watson Hamilton & DeSanctis LLP

(57) ABSTRACT

Systems, devices, and methods are disclosed for encoding behavioral information into an image format to facilitate image based behavioral identification.

19 Claims, 8 Drawing Sheets

FIG. 8

SYSTEMS AND METHODS FOR ENABLING DETECTION OF THREATS BASED UPON COLOR

CROSS REFERENCE TO RELATED APPLICATIONS

The present application claims priority to U.S. Provisional Patent Application No. 63/235,887 entitled "Computer Vision User Entity Behavior Analytics", and filed Aug. 23, 2021 by Khanna. The entirety of the aforementioned application is incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to systems and methods for enabling behavioral identification, and more particularly to systems and methods for encoding behavioral information into an image format to facilitate image based behavioral identification.

BACKGROUND

Data security threats are often caused by outsiders attempting to access a computer network. However, threats from insiders are on the rise. Because the individual creating the threat enjoys a level of trust, such threats are often harder to detect that threats originating outside the boundary of trust. Further, successful completion of a threat by an insider can involve substantial costs.

Hence, there exists a need in the art for enhanced systems, methods, devices, and/or approaches for detecting threats.

SUMMARY

Various embodiments provide systems and methods for encoding behavioral information into an image format to facilitate image based behavioral identification.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

FIG. 8 graphically depicts formation of a color image from the color component images of FIG. 7 in accordance with some embodiments.

DETAILED DESCRIPTION

Figure 1A:
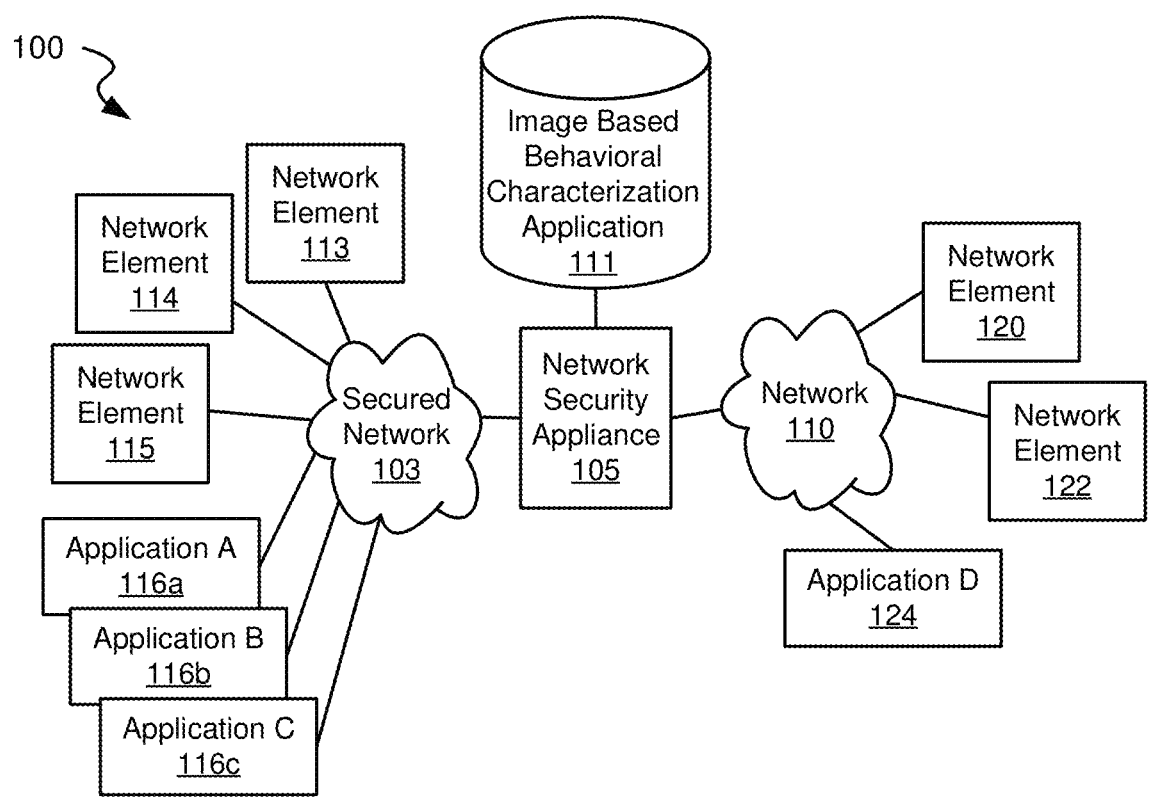
FIGS. 1A-1C illustrate a network architecture including a image based behavioral change detection system in accordance with some embodiments.

Various embodiments provide systems and methods for encoding behavioral information into an image format to facilitate image-based behavioral identification.

Various embodiments convert non-spatial information into a spatial format to enhance behavioral anomaly detection. Such behavioral anomaly detection may be used, for example, in detecting inside threats. While the behavioral anomaly detection may find particular use in relation to detecting inside threats, one of ordinary skill in the art will recognize a larger number of applications of different embodiments discussed herein. As another example, embodiments discussed herein may be useful in identifying positive employee behaviors when such employees are compared with the context of other employees.

In some embodiments, information from a number of data sources are used to describe the actions of an individual. Such data sources may include, but are not limited to, user login information, lightweight directory access protocol (LDAP) information, website access information, file access information, external device information, and email activity information. The login information may include one or more of: a difference between initial logon and office start time, a difference between last logon and office start time, an average difference in time between office start time and number of logins before office hours, an average difference in time between office end time and number of logins after office hours, a total number of logins, a total number of logins outside of office hours, a total number of logoffs, a total number of logoffs outside of office hours, a total number of unique systems accessed, a total number of unique systems accessed outside of office hours, and/or an average session length held outside office hours. The external device information may include, but is not limited to, a total number of external devices used, and/or a total number of external devices used outside of office hours. LDAP information may include, for example, an individual's user identification. File access information may include, but is not limited to, a number of executable files downloaded, run, or handled in some form, a file path variance over a defined period, and/or a file path variance after office hours. Email information may include, but is not limited to, a number of emails sent outside organization domain, a number of recipients that a supervisor has sent emails to within organization domain, a number of attachments sent with emails, an average size of emails, a total number of email recipients, and/or a number of emails identified as the user being disgruntled by a conical classification process. Website access information may include, but is not limited to, a number of websites identified as job posting sites by a conical classification process, a number of websites identified as identified as being Wikileaks™ or Wikileaks™ clones by a conical classification process, and/or a number of websites identified as being keylogger download sites by a conical classification process. Each of these different forms of information are referred to herein generically as features. The aforementioned features may be selected for use in relation to, for example, an insider threat detection system. Based upon the disclosure provided herein, one of ordinary skill in the art will recognize different features that may be selected for use in relation to a threat detection system or other detection system.

Embodiments perform different processes on the features, and the processed features are formatted as a grayscale image. This grayscale image represents a user's behavior over a defined period. An image processing model that is trained to detect changes in images can then be applied to the images for the individual to detect anomalies in the individual's behavior. In some embodiments, such grayscale images can be converted to color by assigning the values in a grayscale image of interest to one color of an RGB color space (e.g., red), and two other grayscale images representing context as respective other colors of the RGB color space (e.g., blue and green). Where there is no difference between the grayscale image of interest and the two other grayscale images used as context, a resulting composite RBG image will be uniformly gray. Alternatively, where there is a difference between the grayscale image of interest and one or both of the two other grayscale images used as context, the resulting composite RBG image will be colorful with the hue defined by the differences in the respective red, green and blue values. Thus, for example, a region in the grayscale image of interest, in this case assigned to be red, having a high value compared with that of both of the grayscale images used for context will cause that region to be a generally red color. Such images allow a user to immediately detect Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "text based information set" is used in its broadest sense to mean any information set that includes at least a portion of natural language text. As such, text based information sets may include, but are not limited to, text messages, emails, documents, or the like. Based upon the disclosure provided herein, one of ordinary skill in the art will recognize a variety of "text based information sets" to which systems and/or methods described herein may be applied.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Various embodiments provide methods for forming behavioral information in an image form. Such methods include: accessing, by a processing resource, a plurality of behavioral features each of corresponding feature types; forming, by the processing resource, the plurality of behavioral features into a feature array, wherein the plurality of behavioral features is located in the feature array according to the respective corresponding feature type; and encoding, by the processing resource, the feature array as a grayscale image.

In some instances of the aforementioned embodiments encoding the feature array as the grayscale image includes applying, by the processing resource, a sparse auto encoder to the feature array. In various instances of the aforementioned embodiments, encoding the feature array as the grayscale image includes modifying, by the processing resource, each behavioral feature of the feature array such that anomalies in behavioral features are distributed away from normal data. In various instances of the aforementioned embodiments, a value of each of the plurality of behavioral features is converted to a range of zero to two hundred, fifty-five.

In some instances of the aforementioned embodiments, the methods further include: accessing, by the processing resource, the plurality of behavioral features from feature sources. In some such instances, the feature sources include one or more of: a user login information source, a lightweight directory access protocol information source, a web-site access information source, a file access information source, an external device information source, and/or an email activity information source. In some cases, a subset of the plurality of behavioral information accessed from the user login information source includes one or more of: a difference between initial logon and office start time, a difference between last logon and office start time, an average difference in time between office start time and number of logins before office hours, an average difference in time between office end time and number of logins after office hours, a total number of logins, a total number of logins outside of office hours, a total number of logoffs, a total number of logoffs outside of office hours, a total number of unique systems accessed, a total number of unique systems accessed outside of office hours, and/or an average session length held outside office hours. In some cases, a subset of the plurality of behavioral information accessed from the lightweight directory access protocol information source include an individual's user identification. In some cases, a subset of the plurality of behavioral information accessed from the website access information source include one or more of: a number of websites identified as job posting sites by a conical classification process, a number of websites identified as identified as being Wikileaks™ or Wikileaks™ clones by a conical classification process, and/or a number of websites identified as being keylogger download sites by a conical classification process. In some cases, a subset of the plurality of behavioral information accessed from the file access information source include one or more of: a number of executable files downloaded, run, or handled in some form, a file path variance over a defined period, and/or a file path variance after office hours. In some cases, a subset of the plurality of behavioral information accessed from the external device information source include one or more of: a total number of external devices used, and/or a total number of external devices used outside of office hours. In some cases, a subset of the plurality of behavioral information accessed from the email activity information source incudes one or more of: a number of emails sent outside organization domain, a number of recipients that a supervisor has sent emails to within organization domain, a number of attachments sent with emails, an average size of emails, a total number of email recipients, and/or a number of emails identified as the user being disgruntled by a conical classification process.

Some embodiments provide systems for forming behavioral information in an image form. Such systems include: a processing resource, and a non-transitory computer-readable medium coupled to the processing resource. The non-transitory computer readable medium has stored therein instructions that when executed by the processing resource cause the processing resource to: access a plurality of behavioral features each of corresponding feature types; form the plurality of behavioral features into a feature array, wherein the plurality of behavioral features is located in the feature array according to the respective corresponding feature type; and encode the feature array as a grayscale image.

Other embodiments provide non-transitory computer-readable storage media embodying a set of instructions, which when executed by a processing resource, causes the processing resource to: access a plurality of behavioral features each of corresponding feature types; form the plurality of behavioral features into a feature array, wherein the plurality of behavioral features is located in the feature array according to the respective corresponding feature type; and encode the feature array as a grayscale image.

Some embodiments provide methods for identifying behavioral changes. Such methods include: accessing, by a processing resource, a target grayscale image, where the target grayscale image represents a target's behavior over a period; accessing, by the processing resource, a first context grayscale image; accessing, by the processing resource, a second context grayscale image; assigning, by the processing resource, the target grayscale image as a first color component of a color image; assigning, by the processing resource, the first context grayscale image as a second color component of the color image; and assigning, by the processing resource, the second context grayscale image as a third color component of the color image. In some instances of the aforementioned embodiment, the first color component is one of red, green, or blue; the second color component is another of red, green, or blue; and the third color component is the remaining of red, green, or blue.

In various instances of the aforementioned embodiments, the methods further include displaying, by the processing resource, the color image; wherein non-gray coloration of the image indicates a deviation of the target behavior from that represented by one or both of the first context grayscale image and the second context grayscale image. In some instances of the aforementioned embodiments where the period is a first period, the first context grayscale image represents the target's behavior over a second period, and the second context grayscale image represents the target's behavior over a third period. In some such instances, the first context grayscale image is a first composite grayscale image representing an average of two or more grayscale images generated over multiple feature window periods, and the second context grayscale image is a second composite grayscale image representing an average of two or more grayscale images over multiple feature window periods.

In various instances of the aforementioned embodiments, the first context grayscale image represents a behavior of a group. In some instances of the aforementioned embodiments, where the period is a first period, the first context grayscale image represents the behavior of the group over a second period. In some such instances where the group is a first group, the second context grayscale image represents a behavior of a second group. In various such cases where the period is a first period, the second context grayscale image represents the behavior of the second group over the second period.

In some instances of the aforementioned embodiments, the target grayscale image includes multiple image locations, and each of the multiple image locations corresponds to a defined non-spatial behavioral information type. In some such instances, the first context grayscale image includes multiple image locations, and the defined non-spatial behavioral information type in each of the multiple image locations of the target grayscale image correspond to the same defined non-behavioral information type in the same location of the first context grayscale image.

Other embodiments provide systems for identifying behavioral changes. Such systems include a processing resource and a non-transitory computer-readable medium coupled to the processing resource. The non-transitory computer readable medium has stored therein instructions that when executed by the processing resource cause the processing resource to: access a target grayscale image, wherein the target grayscale image represents a target's behavior over a period; access a first context grayscale image; access a second context grayscale image; assign the target grayscale image as a first color component of a color image; assign the first context grayscale image as a second color component of the color image; and assign the second context grayscale image as a third color component of the color image.

Yet other embodiments provide non-transitory computer-readable storage media embodying a set of instructions, which when executed by a processing resource, causes the processing resource to: access a target grayscale image, where the target grayscale image represents a target's behavior over a period; access a first context grayscale image; access a second context grayscale image; assign the target grayscale image as a first color component of a color image; assign the first context grayscale image as a second color component of the color image; assign the second context grayscale image as a third color component of the color image; and display the color image.

Turning to FIG. 1A, network architecture 100 is shown in accordance with some embodiments. In the context of network architecture 100, a network security appliance 105 controls access to network elements within a secured network 103. Secured network 103 may be any type of communication network known in the art. Those skilled in the art will appreciate that, secured network 103 can be a wireless network, a wired network, or a combination thereof that can be implemented as one of the various types of networks, such as an Intranet, a Local Area Network (LAN), a Wide Area Network (WAN), an Internet, and the like. Further, secured network 103 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Secured network 103 provides for internetwork communications between network elements 113, 114, 115 and applications 116 (i.e., application A 116a, application B 116b, and application C 116c). Network security appliance 105 operates as a gateway between secured network 103 and outside networks (e.g., a network 110). Network 110 may be any type of network known in the art. Thus, network 110 may be, but is not limited to, a wireless network, a wired network or a combination thereof that can be implemented as one of the various types of networks, such as the Internet, an Intranet, a Local Area Network (LAN), a Wide Area Network (WAN), and the like. Network security appliance 105 provides for communications between network element 113 and network element 120, network element 122, and network element 124 via network 110.

Network security appliance 105 executes an image-based behavioral characterization application 111 that is maintained on a computer readable medium communicably coupled to network security appliance 105. Execution of image-based behavioral characterization application 111 by network security appliance 105 causes non-spatial information to formatted as grayscale images, and to combine three such grayscale images to yield a color image.

Figure 1B:
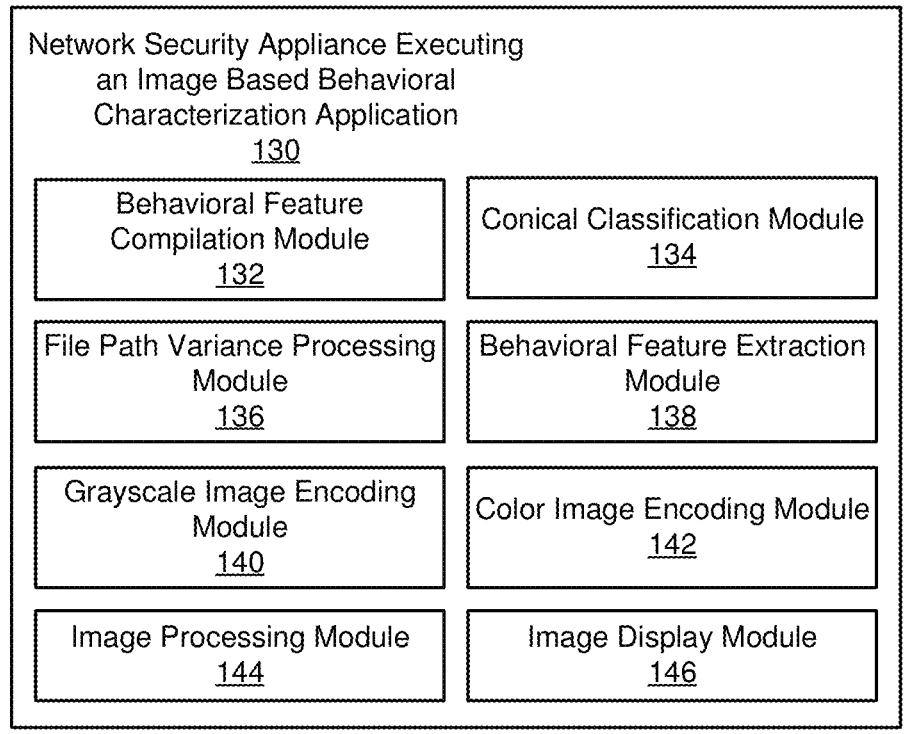

Turning to FIG. 1B, an example implementation of a network security appliance an image-based behavioral characterization application 130 is shown in accordance with some embodiments. As shown, network security appliance an image-based behavioral characterization application 130 includes a behavioral feature compilation module 132, a conical classification module 134, a file path variance processing module 136, a behavioral feature extraction module 138, a grayscale image encoding module 140, a color image encoding module 142, an image processing module 144, and an image display module 146.

Behavioral feature compilation module 132 is configured to access a number of behavioral features. Such behavioral may be any group of activities or attributes associated with the group being monitored. The behavioral features may be derived from accessing one or more data sources. In one embodiment, the data sources from which behavioral features are accessed included user login information, lightweight directory access protocol (LDAP) information, website access information, file access information, external device information, and email activity information.

In such an embodiment, the login information may include one or more of: a difference between initial logon and office start time, a difference between last logon and office start time, an average difference in time between office start time and number of logins before office hours, an average difference in time between office end time and number of logins after office hours, a total number of logins, a total number of logins outside of office hours, a total number of logoffs, a total number of logoffs outside of office hours, a total number of unique systems accessed, a total number of unique systems accessed outside of office hours, and/or an average session length held outside office hours. The external device information may include, but is not limited to, a total number of external devices used, and/or a total number of external devices used outside of office hours. LDAP information may include, for example, an individual's user identification.

File access information may include, but is not limited to, a number of executable files downloaded, run, or handled in some form. The email information may include, but is not limited to, a number of emails sent outside organization domain, a number of recipients that a supervisor has sent emails to within organization domain, a number of attachments sent with emails, an average size of emails, and/or a total number of email recipients. Website access information may include, but is not limited to, a number of websites accessed, and a number of times a given website is re-accessed. The aforementioned features may be selected for use in relation to, for example, an insider threat detection system. Based upon the disclosure provided herein, one of ordinary skill in the art will recognize different features that may be selected for use in relation to a threat detection system or other detection system.

The aforementioned features are gathered over a defined period of time referred to herein as a "feature window". In some embodiments, the feature window is a 24 hour period of time. Using such a 24 hour feature window allows for generation of multiple images that allows for comparison of images between multiple days in an effort to identify one or more days where behavior of an individual deviates significantly from prior days. To this end, it is determined whether a feature window is complete (block 204). Where the feature window is not yet complete (block 204), the collection of the defined features continues for the targets. Based upon the disclosure provided herein, one of ordinary skill in the art will recognize a variety of lengths of feature windows that may be used in relation to different embodiments.

Conical classification module 134 is configured to apply conical classification to yield some of the behavioral features. In some cases, the conical classification processing and/or conical classification module may be performed using approaches and/or systems similar to that discussed in U.S. patent application Ser. No. 17/570,210 entitled "SYSTEMS AND METHODS FOR RAPID NATURAL LANGUAGE BASED MESSAGE CATEGORIZATION", and filed Jan. 6, 2022 by Khanna. The entirety of the aforementioned application is incorporated herein by reference for all purposes.

File path variance processing module 136 is configured to a file path variance algorithm to yield some of the behavioral features. In some cases, the file path variance processing and/or file path variance processing module may be performed using approaches and/or systems similar to that discussed in U.S. patent application Ser. No. 17/464,413 entitled "SYSTEMS AND METHODS FOR QUANTIFYING FILE ACCESS RISK EXPOSURE BY AN ENDPOINT IN A NETWORK ENVIRONMENT", and filed Sep. 1, 2021 by Khanna. The entirety of the aforementioned reference is incorporated herein by reference for all purposes.

Behavioral feature extraction module 138 is configured to form the various behavioral features into a feature array where each location in the feature array includes behavioral features of a feature type defined for that location.

Grayscale image encoding module 140 is configured to encode a feature array into a grayscale image, and color image encoding module 142 is configured to incorporate multiple grayscale images to yield a color image. Image processing module 144 is configured to apply one or more models to either grayscale images or color images. Image display module 146 is configured to display one or both of color images and/or grayscale images.

Figure 1C:
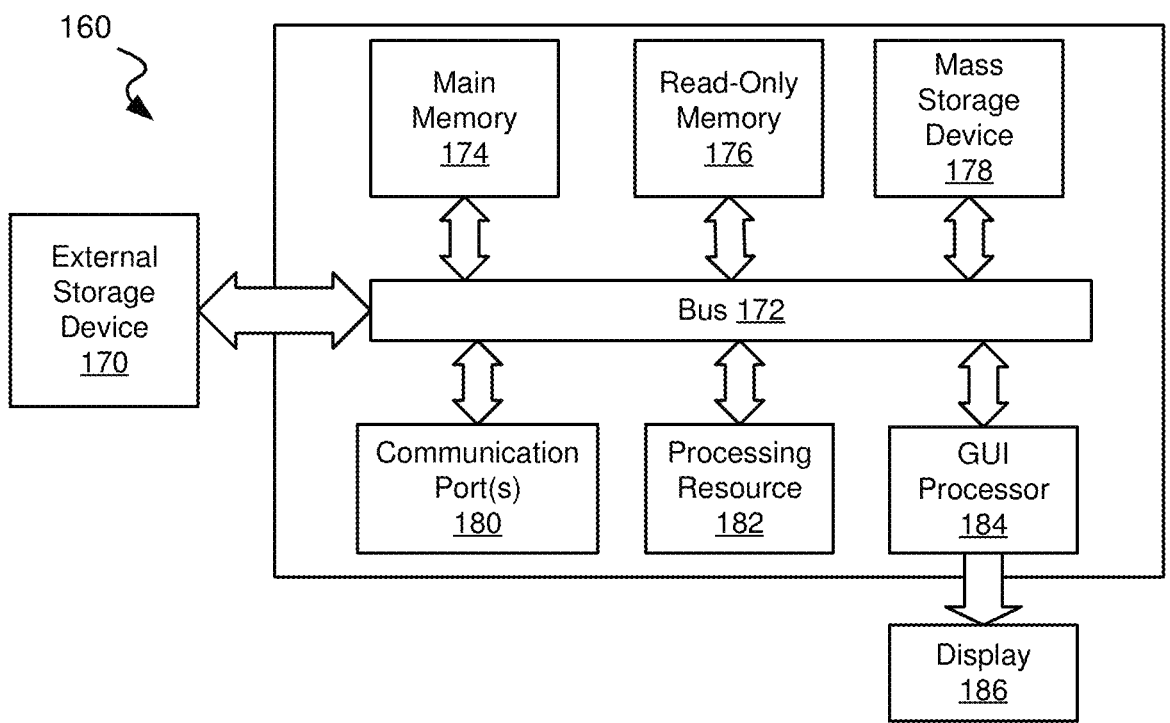

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, one or more processing resources (e.g., processing circuitry 182), and a graphical user interface (GUI) processor 184. GUI processor 184 drives a display 186. In one embodiment, computer system 160 may represent some portion of any of network security appliance 105.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
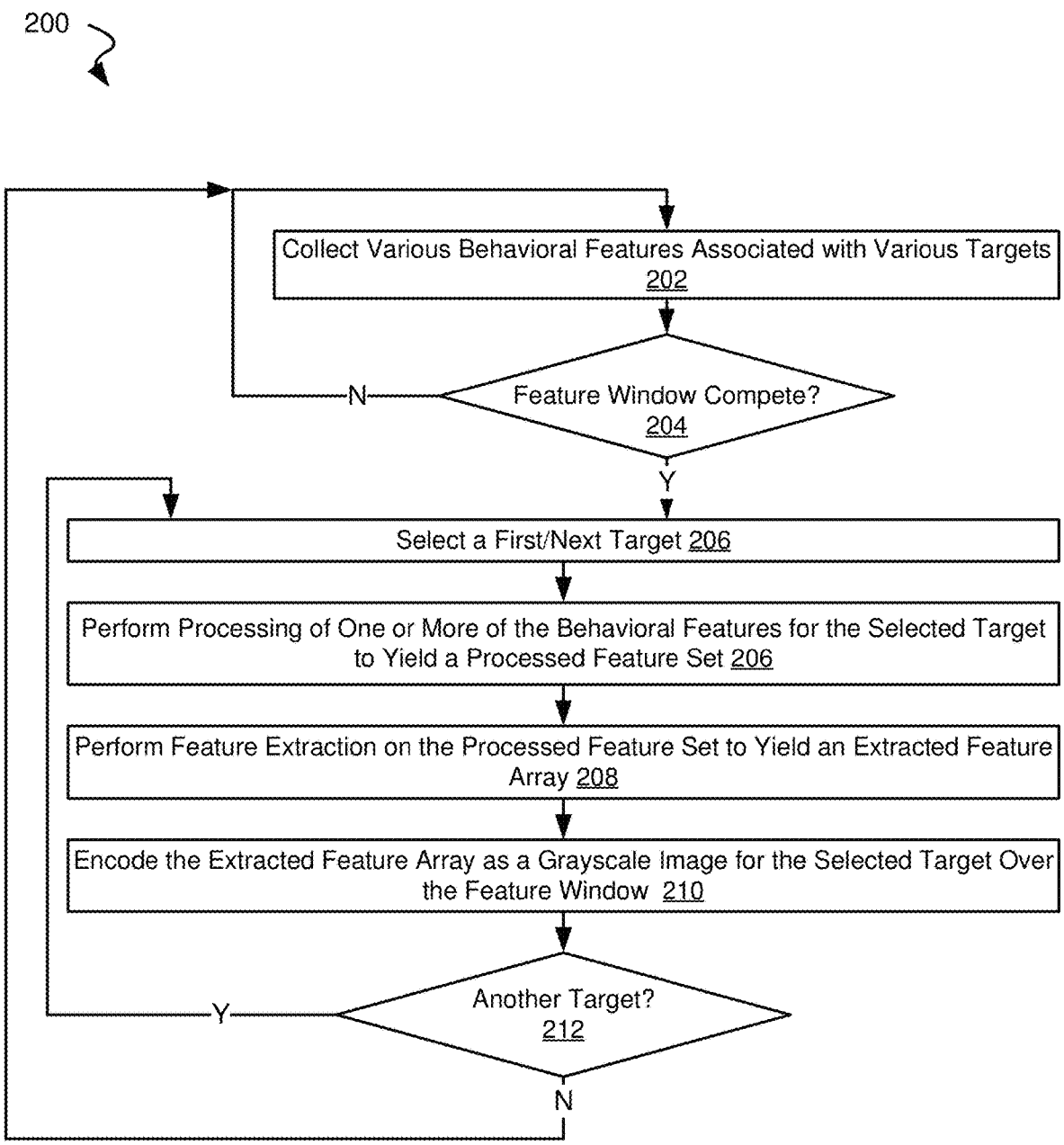
FIG. 2 is a flow diagram showing a method in accordance with various embodiments for generating images based upon a number of behavioral features.

Turning to FIG. 2, a flow diagram 200 shows a method in accordance with various embodiments for generating images based upon a number of behavioral features. Following flow diagram 200, various behavioral features associated with various targets are collected (block 202). The targets may include, for example, individuals within a defined group that is being monitored. In one particular embodiment, the defined group are users who have been granted inside access to a computer network. In some cases, this may be employees of a company where the computer network is maintained by the company. Based upon the disclosure provided herein, one of ordinary skill in the art will recognize a variety of groups that may be monitored in accordance with different embodiments.

The behavioral features may be any group of activities or attributes associated with the group being monitored. The behavioral features may be derived from accessing one or more data sources. In one embodiment, the data sources from which behavioral features are accessed included user login information, lightweight directory access protocol (LDAP) information, website access information, file access information, external device information, and email activity information.

In such an embodiment, the login information may include one or more of: a difference between initial logon and office start time, a difference between last logon and office start time, an average difference in time between office start time and number of logins before office hours, an average difference in time between office end time and number of logins after office hours, a total number of logins, a total number of logins outside of office hours, a total number of logoffs, a total number of logoffs outside of office hours, a total number of unique systems accessed, a total number of unique systems accessed outside of office hours, and/or an average session length held outside office hours. The external device information may include, but is not limited to, a total number of external devices used, and/or a total number of external devices used outside of office hours. LDAP information may include, for example, an individual's user identification.

File access information may include, but is not limited to, a number of executable files downloaded, run, or handled in some form. The email information may include, but is not limited to, a number of emails sent outside organization domain, a number of recipients that a supervisor has sent emails to within organization domain, a number of attachments sent with emails, an average size of emails, and/or a total number of email recipients. Website access information may include, but is not limited to, a number of websites accessed, and a number of times a given website is re-accessed. The aforementioned features may be selected for use in relation to, for example, an insider threat detection system. Based upon the disclosure provided herein, one of ordinary skill in the art will recognize different features that may be selected for use in relation to a threat detection system or other detection system.

The aforementioned features are gathered over a defined period of time referred to herein as a "feature window". In some embodiments, the feature window is a 24 hour period of time. Using such a 24 hour feature window allows for generation of multiple images that allows for comparison of images between multiple days in an effort to identify one or more days where behavior of an individual deviates significantly from prior days. To this end, it is determined whether a feature window is complete (block 204). Where the feature window is not yet complete (block 204), the collection of the defined features continues for the targets. Based upon the disclosure provided herein, one of ordinary skill in the art will recognize a variety of lengths of feature windows that may be used in relation to different embodiments.

Alternatively, where the feature window has completed (block 204), a first/next one of the monitored targets is selected for processing (block 206). Processing of one or more of the behavioral features for the selected target is performed to yield a processed feature set (block 206). In some cases, one or more of the collected behavioral features are not subjected to additional processing, but rather are simply incorporated into the processed feature set. Other of the one or more of the collected behavioral features are processed to yield derived data. For example, in some embodiments, file access information may be processed to calculate: a file path variance over a defined period, and/or a file path variance after office hours. This processing may be done by, for example, by a file path variance processing module. In some cases, the file path variance processing and/or file path variance processing module may be performed using approaches and/or systems similar to that discussed in U.S. patent application Ser. No. 17/464,413 entitled "SYSTEMS AND METHODS FOR QUANTIFYING FILE ACCESS RISK EXPOSURE BY AN ENDPOINT IN A NETWORK ENVIRONMENT", and filed Sep. 1, 2021 by Khanna. The entirety of the aforementioned reference is incorporated herein by reference for all purposes. As another example, in some embodiments, website information and email information may be processed using conical classification to yield: a number of emails identified as the user being disgruntled by a conical classification process, a number of websites identified as job posting sites by a conical classification process, a number of websites identified as identified as being Wikileaks™ or Wikileaks™ clones by a conical classification process, and/or a number of websites identified as being keylogger download sites by a conical classification process. This processing may be done by, for example, by a conical classification module. In some cases, the conical classification processing and/or conical classification module may be performed using approaches and/or systems similar to that discussed U.S. patent application Ser. No. 17/570,210 entitled "SYSTEMS AND METHODS FOR RAPID NATURAL LANGUAGE BASED MESSAGE CATEGORIZATION", and filed Jan. 6, 2022 by Khanna.

Figure 3:
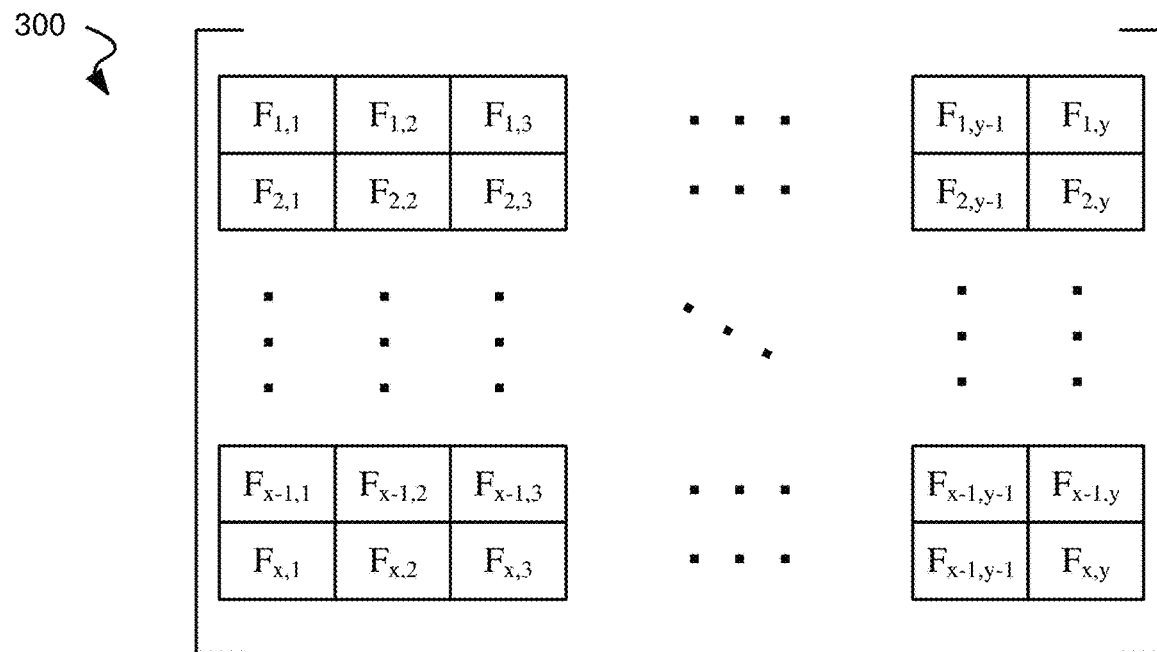
FIG. 3 graphically depicts an extracted feature array generated as part of the method of FIG. 2.

Feature extraction is performed on the processed feature set to yield an extracted feature array (block 208). Such feature extraction includes assembling each feature of the processed feature set into defined locations of an array of size x,y. In some embodiments, the value of x is thirty-two (32) and the value of y is thirty-two (32). Turning to FIG. 3, an example extracted feature array 300 is shown that may be generated using the processes of FIG. 2. As shown, extracted feature array 300 has a number of features ($F_{1,1}, F_{1,2} \ldots F_{x,y}$) each arranged in assigned locations within the array.

Returning to FIG. 2 and following flow diagram 200, the extracted feature array is encoded as a grayscale image for the selected target representing behavior during the feature window (block 210). Such encoding includes applying a sparse auto encoder (SAE) model. The loss function for such an SAE model is as follows:

$$L_{sparse} = L + \beta \Sigma_j D_{KL}(\rho \| \hat{\rho}_j)$$

In the aforementioned equation, $D_{KL}$ is defined by the following equation:

$$D_{KL}(\rho \| \hat{\rho}_j) = \rho \log \frac{\rho}{\hat{\rho}_j} + (1-\rho) \log \frac{1-\rho}{1-\hat{\rho}_j}$$

which is the Kullback-Leiber divergence between a Bernoulli random variable with mean r and Bernoulli random variable with mean $\rho_j$. The value of $\rho_j$ is represented by the following equation:

$$\hat{\rho}_j = \frac{1}{m} \sum_{k=1}^{m} a_j(x^{(i)})$$

SAE models are commonly used in anomaly detection where they are trained on normal data only. In such cases, the expectation is that the reconstruction error will be noticeably higher on anomalies than it will on normal data, as anomalies will be encoded differently and thus will be distributed away from normal data. A threshold parameter may then be used to separate vectors into normal and anomalous classes. In contrast, embodiments discussed herein use an SAE hidden layer to automatically learn better feature representations from the given data.

The output of the SAE is converted into a range of 0-255 that is suitable for representation as an image. This is done by applying Min-Max scaling to each of the values of the SAE model, and then the resulting min-max value is multiplied by 255. In some embodiments, applying the min-max scaling and subsequent multiplication by 255 is done in the layers of the SAE model. Performing the processes within the SAE model reduces latency and memory requirements for the training. In some embodiments, the SAE model has a hidden dimension of 1024, and once the scaling processes are complete it is reshaped into a 32×32 grayscale image representing the behavior of the target over the period of the feature window.

Figure 4:
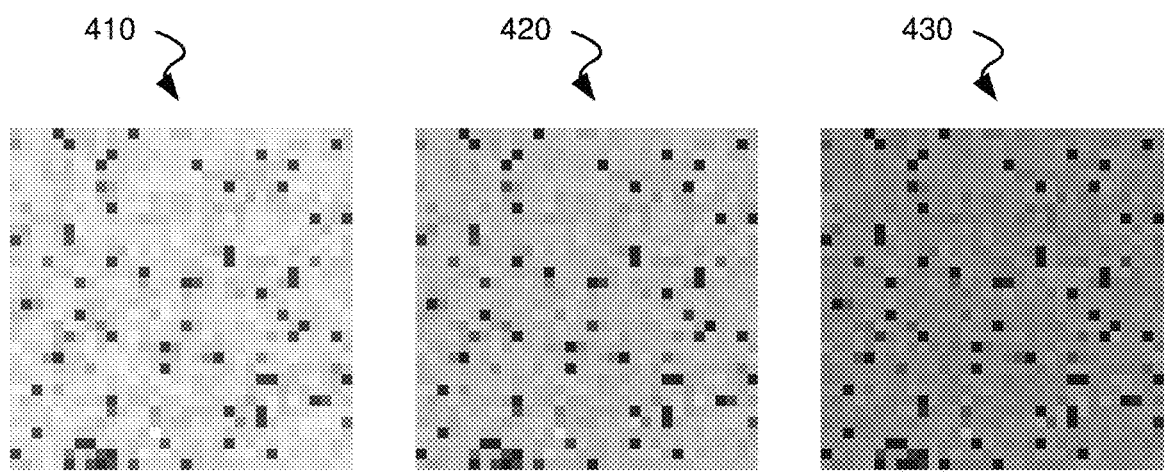
FIG. 4 shows examples of images for a particular target generated over different feature windows as part of the method of FIG. 2.

Turning to FIG. 4, examples of grayscale images (i.e., grayscale image 410, grayscale image 420, and grayscale image 430) created using the processes of FIG. 2 are shown. As shown in the example images, different locations within the pixel array have a different grayscale value (a value from 0-255) that corresponds to the behavioral feature underlying the particular location within the image. Each of the respective images represents a different target and/or period of the feature window. As one example, grayscale image 410 may represent the current day for a particular target, grayscale image 420 may represent the preceding day for the particular target, and grayscale image 430 may represent two days earlier for the particular target. As another example, grayscale image 410 may represent the current day for a particular target, grayscale image 420 may represent the current day for a first target, and grayscale image 430 may represent the current day for a third target. A number of these grayscale images may be used to train an existing image-based anomaly detection model. As such, an existing image-based anomaly detection model designed to process spatial data may be used to process non-spatial data.

Returning to FIG. 2, it is determined whether data for another target remains to be processed (block 212). Where data for another target remains to be processed (block 212), the next target is selected (block 206) and the processes of blocks 208-212 are repeated for the next selected target. Otherwise, the process returns to collecting behavioral features for the next feature window period (block 202).

Figure 5:
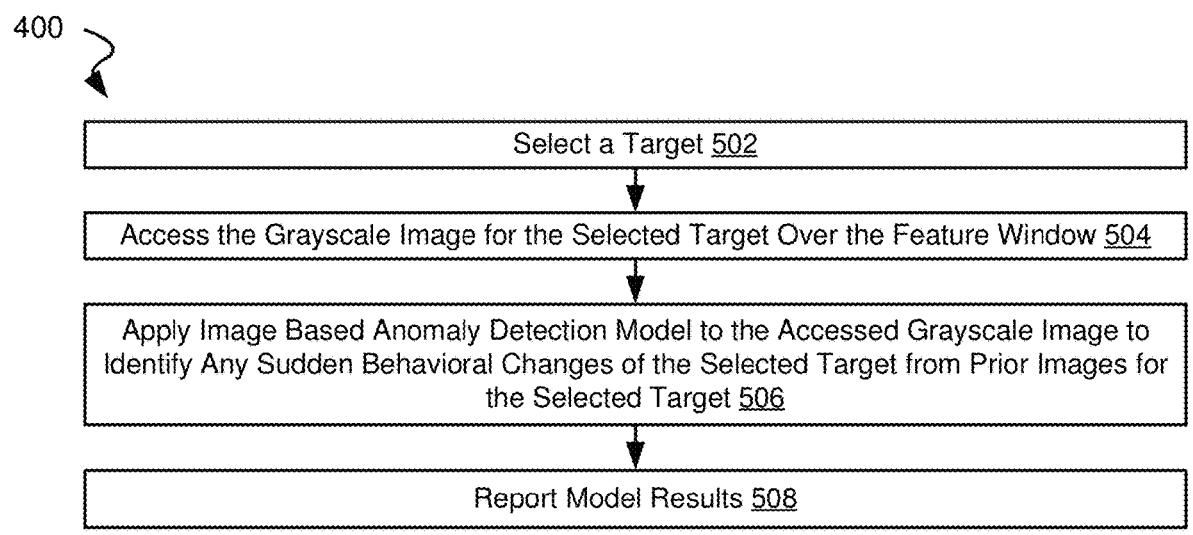
FIG. 5 is a flow diagram showing a method in accordance with some embodiments for processing grayscale images generated using the method of FIG. 2.

Turning to FIG. 5, a flow diagram 500 shows a method in accordance with some embodiments for processing grayscale images generated using the method of FIG. 2. Following flow diagram 500, A target is selected (block 502), and a grayscale image for the selected target over a desired period is accessed (block 504). The accessed grayscale image may have been generated based upon non-spatial data similar to that discussed above in relation to FIG. 2.

An image-based anomaly detection model is applied to the accessed grayscale image to identify and sudden behavioral changes of the selected target (block 506). The image-based anomaly detection model may be any model known in the art for detecting anomalies based upon images. Based upon the disclosure provide herein, one of ordinary skill in the art will recognize a variety of existing image-based anomaly detection models that may be applied to the grayscale images generated in accordance with FIG. 2 that may be used in relation to different embodiments. The results are reported (block 508). Such reporting of results may be done using any approach and/or systems known in the art for reporting results.

Figure 6:
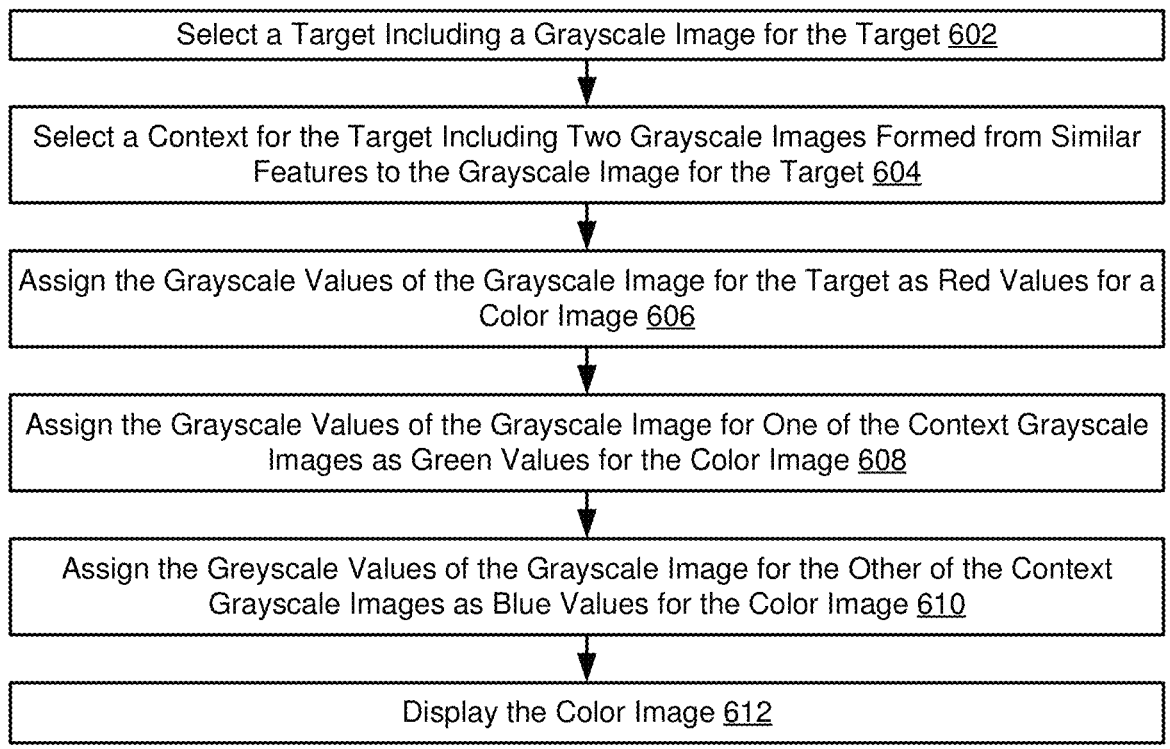
FIG. 6 is a flow diagram showing a method for forming color images using a group of grayscale images generated using the method of FIG. 2 in accordance with various embodiments.

Turning to FIG. 6, a flow diagram 600 shows a method in accordance with some embodiments for forming color images using a group of grayscale images generated using the method of FIG. 2. Following flow diagram 600, a target is selected (block 602). The target has one or more grayscale images that were previously generated using the processes of FIG. 2. In some cases, the target may have a grayscale image that represents a current day or other period depending upon the feature window used in FIG. 2. Further, the target may have a number of grays scale images corresponding to prior feature window periods.

A context for the selected target is selected (block 604). The context may be, for example, prior feature windows for the same target, current feature windows for other targets similarly situated to the selected target (e.g., co-workers of the selected target), composite grayscale images representing an average of the target's behavior over a defined period preceding the current feature window, and/or or composite grayscale images representing an average of other targets similarly situated to the selected target. Such a composite grayscale image may include averaging image positions (i.e., pixel values) across a number of grayscale images generated using the processes of FIG. 2 to yield a grayscale image representing a group of targets. In one particular embodiment, one of the context grayscale images is a composite grayscale image representing average feature values from the beginning of a target's time with the organization, and the other context grayscale image is a composite grayscale image representing average feature values over a preceding week. In another embodiment, one of the context grayscale images is a composite grayscale image representing average feature values for a number of employees similarly situated to the target, and the other context grayscale image is a composite grayscale image representing average feature values for teammates of the target. Based upon the disclosure provided herein, one of ordinary skill in the art will recognize a variety of contexts that may be selected in accordance with different embodiments.

The context includes two gray scale images. The two grayscale images may include, but are not limited to, grayscale images for the same target for preceding feature windows, grayscale images for different targets over the same feature window, composite grayscale images for the current feature window and one preceding feature window. Based upon the disclosure provided herein, one of ordinary skill in the art will recognize a variety of combinations of grayscale images generated using the processes of FIG. 2 that may be used in relation to different embodiments.

The grayscale values for the grayscale image of the selected target are assigned to be red component values for a color image (block 606). Thus, where the value of position$_{1,1}$ grayscale image of the selected target is a value representing a level of gray from 0-255, that value is used to indicate an amount of red that is to be used in a color representation. As such, the grayscale image of the selected target becomes the red component of the color image. While this embodiment assigns the grayscale values of the grayscale image of the selected target to be red, one of ordinary skill in the art will recognize that other component colors (i.e., blue or green) may be assigned for the grayscale image of the selected target.

The grayscale values for the two context grayscale images are respectively assigned to be blue component values and green component values for the color image (block 608 and block 610). As such, the context grayscale images respectively become the green component and the blue component of the color image. Again, the assignment of a particular color component to a grayscale image may be arbitrary, however, it is important that of the three grayscale images (i.e., the two context grayscale images and the grayscale image of the selected target are respectively assigned to be different color components (e.g., red, green, blue)). At this juncture, the individual values of three grayscale images have been assigned to represent one of red, green, or blue.

Figure 7:
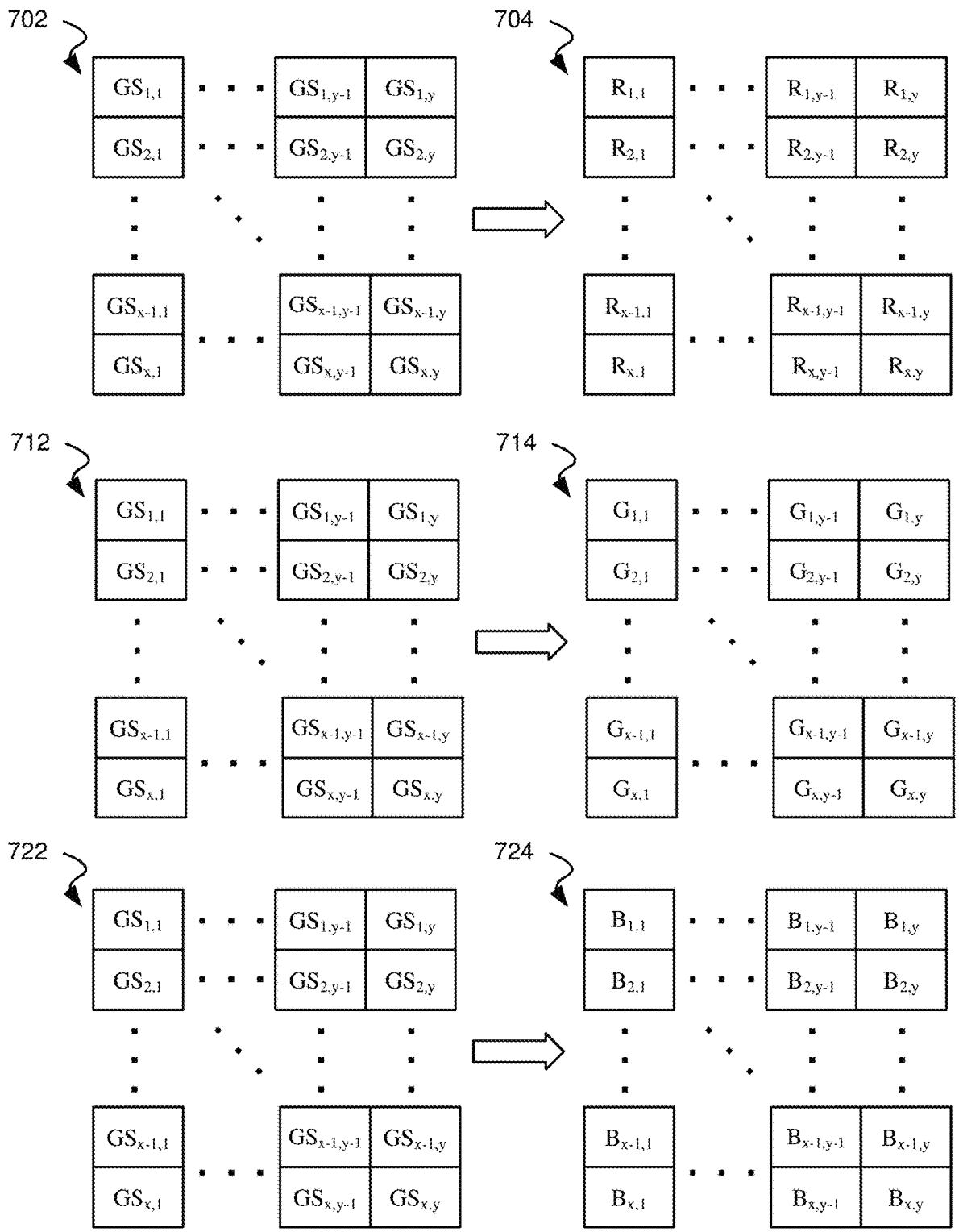
FIG. 7 graphically depicts conversion of a target grayscale image and two context grayscale images to respective color component images.

The aforementioned process is graphically represented in FIG. 7, where a grayscale image 702 of the selected target is assigned to be red in a color modified grayscale image 704. As shown, element$_{1,1}$ has a grayscale value $GS_{1,1}$ in grayscale image 702 is assigned to be a red value ($R_{1,1}$). This process is repeated for each of the individual elements$_{m,n}$ (where m=1 to x, and n=1 to y) of grayscale image 702. Similarly, a grayscale image 712 of one of the context grayscale images is assigned to be blue in a color modified grayscale image 714. As shown, element$_{1,1}$ has a grayscale value $GS_{1,1}$ in grayscale image 712 is assigned to be a blue value ($R_{1,1}$). This process is repeated for each of the individual elements$_{m,n}$ (where m=1 to x, and n=1 to y) of grayscale image 712. A grayscale image 722 of the other context grayscale images is assigned to be green in a color modified grayscale image 724. As shown, element$_{1,1}$ has a grayscale value $GS_{1,1}$ in grayscale image 712 is assigned to be a green value ($G_{1,1}$). This process is repeated for each of the individual elements$_{m,n}$ (where m=1 to x, and n=1 to y) of grayscale image 722.

Figure 8:
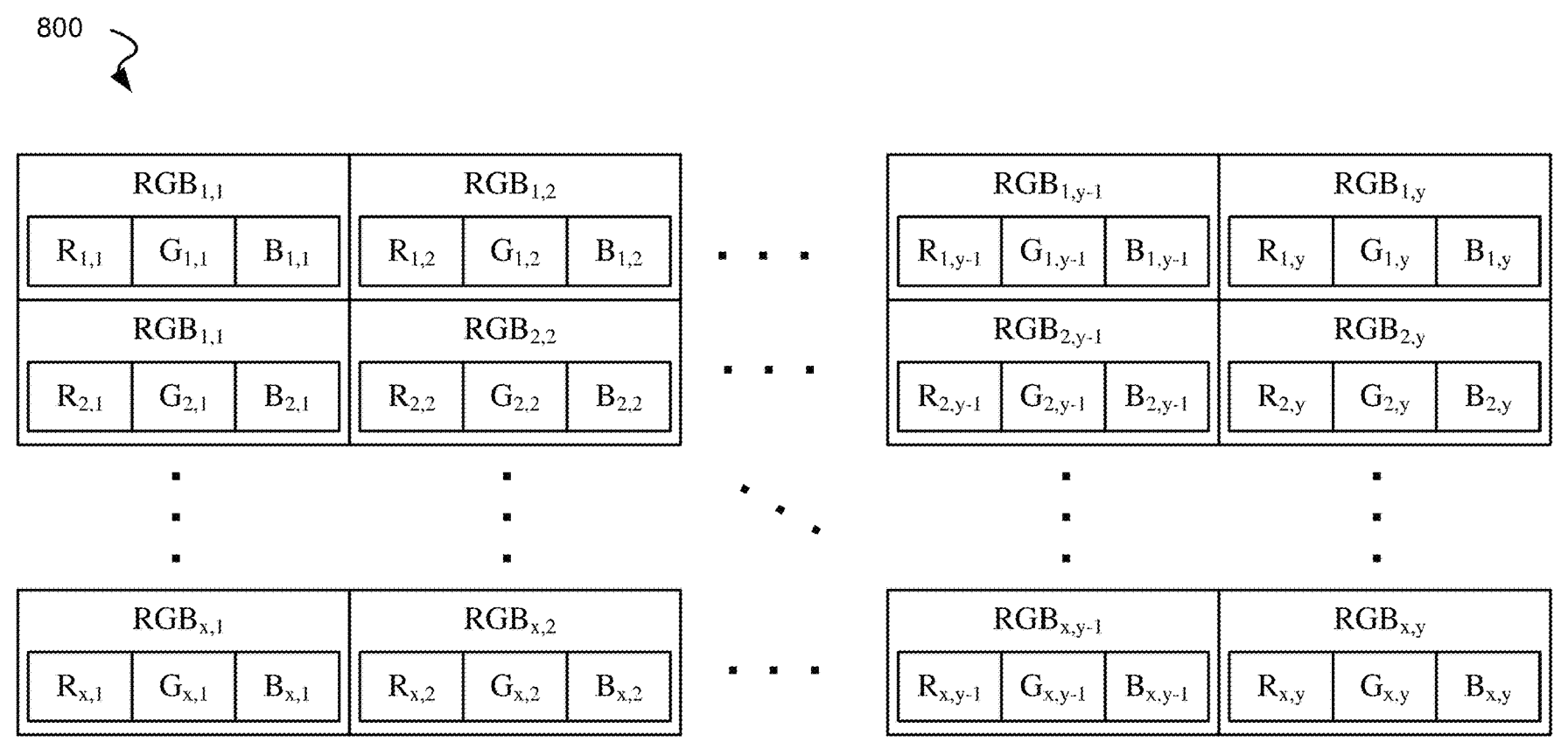

Turning to FIG. 8, an example color image 800 created using the processes of FIG. 6 is shown. As shown, color image 800 includes a number of elements$_{m,n}$ (where m=1 to x, and n=1 to y) including color components derived from three distinct grayscale images (i.e., the two context grayscale images and the grayscale image of the selected target). As an example, the element$_{1,1}$ of the grayscale image of the selected target is the red component ($R_{1,1}$) of $RGB_{1,1}$; the element$_{1,1}$ of the grayscale image of one of the context grayscale images is the green component ($G_{1,1}$) of $RGB_{1,1}$; and the element$_{1,1}$ of the grayscale image of the other context grayscale images is the blue component ($G_{1,1}$) of $RGB_{1,1}$.

Returning to FIG. 6, the color image includes all three of the color component values assigned based upon the grayscale values of the respective grayscale images, and is displayed via a display (block 612). Using context grayscale images from preceding feature window periods for the same target rather than simply comparing the activity level via a detection regime, the potential for an attacker to take advantage of detection loopholes and acting undetected is reduced. If a target is not engaged in malicious behavior, the expectation is that there will be very little variance between grayscale images over successive feature window periods. In such a situation, the combination of the grayscale image for the current feature window period with the context grayscale images to yield a color image will result in a color image that is mostly gray in appearance because of the similar RGB values. In contrast, where a user is engaged in malicious behavior, malicious actions are expected to include a variance between feature window periods. This variance will be shown as color in the resulting color image. In some embodiments, the RGB is calibrated so that when the red, green, and blue color components for a given location (i.e., pixel) are equal, the location is represented as a shade of gray where larger RGB values represent a lighter shade of gray.

To assure this, the SAE model is trained such that the red, green, and blue numbers will be fairly similar to one another where there is little change in behavior across the feature window periods. In contrast, the SAE model is trained such that significant differences in the red, green, and blue numbers will result where there is a change in the user's behavior across the feature window periods. Formatting in this way to generate color images allows even a non-trained individual to quickly and easily identify potential malicious behavior. In some embodiments, Tree Parzen Estimation (TPE) hyperparameter tuning is used to maximize the separability of malicious behavior from benign behavior as determined via linear evaluation, keeping the parameter set that achieved the best performance. Thus, when malicious behavior is seen, we see cross-channel differences across the vast majority of dimensions, leading to the malicious images taking similar shades of color throughout the image encoding.

While flow diagram 600 is discussed as assigning RGB color components to each of three grayscale images, and combining the color assigned grayscale images to create a color image, in other embodiments cyan, magenta, and yellow (CMYK) color components may be similarly assigned to each of three grayscale images to yield a color image.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims,

What is claimed is:

1. A method for identifying behavioral changes, the method comprising:
    generating, by processing circuitry of a computing system in a computing network, a target grayscale image representing behavior of a target user using the computing network over a first period of time;
    generating, by the processing circuitry, a first context grayscale image representing a first set of behaviors of one or more users of the computing network;
    generating, by the processing circuitry, a second context grayscale image representing a second set of behaviors of one or more users of the computing network;
    assigning, by the processing circuitry, the target grayscale image as a first color component of a color image;
    assigning, by the processing circuitry, the first context grayscale image as a second color component of the color image;
    assigning, by the processing resource, the second context grayscale image as a third color component of the color image; and
    displaying, by the computing system, the color image, wherein non-gray coloration of the color image indicates a deviation of the target user's behavior using the computing network from at least one of the first set of behaviors represented by the first context grayscale image and the second set of behaviors represented by the second context grayscale image.

2. The method of claim 1, wherein the first color component is one of red, green, or blue; wherein the second color component is another of red, green, or blue; and wherein the third color component is the remaining of red, green, or blue.

3. The method of claim 1, wherein the first context grayscale image represents the target user's behavior over a second period of time, and wherein the second context grayscale image represents the target user's behavior over a third period of time.

4. The method of claim 3, wherein the first context grayscale image is a first composite grayscale image representing an average of two or more grayscale images generated over multiple feature window periods, and wherein the second context grayscale image is a second composite grayscale image representing an average of two or more grayscale images over multiple feature window periods.

5. The method of claim 1, wherein the first context grayscale image represents behaviors of a group of users of the computer network.

6. The method of claim 5, wherein the first context grayscale image represents behaviors of the group of users of the computer network over a second period of time.

7. The method of claim 5, wherein the group is a first group, and wherein the second context grayscale image represents behaviors of a second group of users of the computer network.

8. The method of claim 7, wherein the second context grayscale image represents behaviors of the second group over the second period of time.

9. The method of claim 1, wherein the target grayscale image includes multiple image locations, and wherein each of the multiple image locations corresponds to a defined non-spatial behavioral information type.

10. The method of claim 9, wherein the first context grayscale image includes multiple image locations, and wherein the defined non-spatial behavioral information type in each of the multiple image locations of the target grayscale image corresponds to the same defined non-behavioral information type in the same location of the first context grayscale image.

11. A system for identifying behavioral changes, the system comprising:
- processing circuitry of a computing system in a computing network;
- a non-transitory computer-readable medium, coupled to the processing circuitry, having stored therein instructions that when executed by the processing circuitry cause the processing circuitry to:
  - generate, by processing circuitry of a computing system in a computing network, a target grayscale image representing behavior of a target user using the computing network over a first period of time;
  - generate, by the processing circuitry, a first context grayscale image representing a first set of behaviors of one or more users of the computing network;
  - generate, by the processing circuitry, a second context grayscale image representing a second set of behaviors of one or more users of the computing network;
  - assign, by the processing circuitry, the target grayscale image as a first color component of a color image;
  - assign, by the processing circuitry, the first context grayscale image as a second color component of the color image;
  - assign, by the processing resource, the second context grayscale image as a third color component of the color image; and
  - display, by the computing system, the color image, wherein non-gray coloration of the color image indicates a deviation of the target user's behavior using the computing network from at least one of the first set of behaviors represented by the first context grayscale image and the second set of behaviors represented by the second context grayscale image.

12. The system of claim 11, wherein the first color component is one of red, green, or blue; wherein the second color component is another of red, green, or blue; and wherein the third color component is the remaining of red, green, or blue.

13. The system of claim 11, wherein the first context grayscale image represents the target user's behavior over a second period of time, and wherein the second context grayscale image represents the target user's behavior over a third period of time.

14. The system of claim 13, wherein the first context grayscale image is a first composite grayscale image representing an average of two or more grayscale images generated over multiple feature window periods, and wherein the second context grayscale image is a second composite grayscale image representing an average of two or more grayscale images over multiple feature window periods.

15. The system of claim 11, wherein the first context grayscale image represents behaviors of a group of users of the computer network.

16. The system of claim 11, wherein the first context grayscale image represents the behaviors of the group over a second period of time.

17. The system of claim 11, wherein the target grayscale image includes multiple image locations, and wherein each of the multiple image locations corresponds to a defined non-spatial behavioral information type.

18. The system of claim 17, wherein the first context grayscale image includes multiple image locations, and wherein the defined non-spatial behavioral information type in each of the multiple image locations of the target grayscale image corresponds to the same defined non-behavioral information type in the same location of the first context grayscale image.

19. A non-transitory computer-readable storage medium embodying a set of instructions, which when executed by processing circuitry of a computing system in a computer network, causes the processing circuitry to:
- generate, by processing circuitry of a computing system in a computing network, a target grayscale image representing behavior of a target user using the computing network over a first period of time;
- generate, by the processing circuitry, a first context grayscale image representing a first set of behaviors of one or more users of the computing network;
- generate, by the processing circuitry, a second context grayscale image representing a second set of behaviors of one or more users of the computing network;
- assign, by the processing circuitry, the target grayscale image as a first color component of a color image;
- assign, by the processing circuitry, the first context grayscale image as a second color component of the color image;
- assign, by the processing resource, the second context grayscale image as a third color component of the color image; and
- display, by the computing system, the color image, wherein non-gray coloration of the color image indicates a deviation of the target user's behavior using the computing network from at least one of the first set of behaviors represented by the first context grayscale image and the second set of behaviors represented by the second context grayscale image.

\* \* \* \* \*